United States Patent [19]

Allbright et al.

[11] Patent Number: 4,492,724
[45] Date of Patent: Jan. 8, 1985

[54] HUMIDITY-RESISTANT WET-STICK ADHESIVES

[75] Inventors: Charles T. Allbright, Covina; Dennis S. Culp, Rancho Cucamonga, both of Calif.

[73] Assignee: Avery International Corp., Pasadena, Calif.

[21] Appl. No.: 397,837

[22] Filed: Jul. 13, 1982

[51] Int. Cl.$^3$ .............................. B32B 7/06; B32B 7/10
[52] U.S. Cl. ..................................... 428/40; 428/350; 428/355; 428/356; 525/196; 525/221; 524/372; 524/375; 524/522
[58] Field of Search ................ 525/221, 196; 524/372, 524/375, 522; 428/40, 350, 355, 356

[56] References Cited

U.S. PATENT DOCUMENTS 4,033,918  7/1977  Hauber ........................ 525/221 X Primary Examiner—Alexander S. Thomas
Attorney, Agent, or Firm—Christie, Parker & Hale

[57] ABSTRACT

A humidity-resistant wet-stick adhesive is comprised of a vinyl acetate-acrylic acid-2-ethyl hexyl acrylate elastomer, a methacrylic acid-ethyl acrylate copolymer, and an acrylic acid polymer system having an average molecular weight of from about 70,000 to about 90,000, and as the tackifier, at least one alkylaryl polyether alcohol.

12 Claims, No Drawings

HUMIDITY-RESISTANT WET-STICK ADHESIVES

BACKGROUND OF THE INVENTION

Conventional pressure-sensitive adhesives are hydrophobic in nature. As such, they adhere poorly to wet or damp surfaces and cannot generally be effectively removed by water, even using automated cleaning procedures which employ detergents, warm water, and/or mild caustics.

While water resistance of conventional pressure-sensitive adhesives is an obvious advantage to many enduse applications, there are certain applications where it is desired to have an adhesive adhere to a wet surface. For instance, in the pharmaceutical and beverage industries, it is frequently desirable to label bottles and other containers in-line immediately after washing and rinsing processes, while the containers are still surface-wet. In this application, conventional pressure-sensitive adhesives simply will not adhere satisfactorily.

For many applications it is desirable to use pressure-sensitive adhesives for permanent labeling of an object to provide sufficient tamperproofness so that labels cannot be removed intact while the label is still needed. Examples include price-marking labels which cannot be transferred by a customer in retail outlets, and product-identification labels used on recyclable containers. While conventional pressure-sensitive adhesives can meet the tamperproofness requirements, they are very difficult to remove when the function of tamperproofness is no longer required.

It would be desirable, therefore, to have a pressure-sensitive adhesive which is tamperproof under ordinary use conditions but which can be easily removed with water in a household and/or commercial cleaning process(es).

Several attempts have been made to develop water-soluble, pressure-sensitive adhesives, but the adhesives heretofore known have suffered from deficiencies in performance, which has retarded their utility.

Adhesives based on polyvinyl methyl ether were among the earliest water-soluble, pressure-sensitive adhesives. While they had fair adhesive properties and could be used for limited applications, several deficiencies restricted their utility. They did not, for instance, absorb water rapidly enough to adhere to a wet surface. In addition, they were insoluble in hot water, and could not be removed by commercial cleaning equipment. Also, their holding power under stress prohibited use on small-diameter cylindrical objects where the paper facestock used was conventional.

Partial esters such as polyvinylmethyl ether/maleic anhydride with nonionic surfactants of the nonyl phenol ethylene oxide adduct type have also been used. These adhesives were soluble in both hot and cold water for easy removability, but were so extremely humidity-sensitive that they could not be used for application to small items or objects because of low adhesion at low relative humidity and ready cohesive failure at high relative humidity.

Other water-soluble, pressure-sensitive adhesives have been developed which include compounds of polyvinyl pyrrolidone with water-soluble plasticizers, copolymers of acrylic acid and alkyl acrylates and others, but none has had the desired good pressure-sensitive adhesive properties, rapid adhesion to wet surface and easy removability in commercial equipment, and retention of the desired properties at high and low relative humidities.

A need therefore exists for an adhesive which has good adhesion to both wet and dry surfaces, whether cold or warm, whether polar or non-polar, with sufficient permanence to be regarded as tamperproof when combined with ordinary label papers; but yet easily removed, when desired, with warm or cold water or with detergents and alkalis used in commercial, or even domestic, cleaning operations. These objectives, as well as the objective of providing adhesives which resist degradation or deterioration under conditions of high and low relative humidity, are the subject of the instant invention.

SUMMARY OF THE INVENTION

It has now been found that pressure-sensitive adhesives of the desired properties can be formulated from three basic components. The first component is a backbone-resin system formed of a normally solid, elastomeric polymer and a normally solid, brittle copolymer.

The second component of the adhesive composition is a normally solid, non-tacky acrylic acid polymer system having an average molecular weight of from about 70,000 to about 90,000 and capable of controlled absorption of moisture from a surface without loss of pressure-sensitive adhesive tack and solubilization of the adhesive formulaiton. It is presently preferred that the acrylic acid polymer system comprise a mixture of a normally solid, high molecular-weight acrylic acid homopolymer having a molecular weight of about 100,000 in combination with a normally solid, low molecular-weight acrylic acid homopolymer having a molecular weight of about 60,000. In combination, the high molecular-weight acrylic acid homopolymer provides controlled moisture absorption synergistically in cooperation with the low molecular-weight acrylic acid homopolymer, which provides fast water take-up. The normally solid polymeric materials used in the two components are all non-pressure-sensitive. To induce tack required for pressure-sensitive properties, there is employed at least one nonionic surfactant, which is an alkylaryl polyether alcohol, present in an amount sufficient to impart tack to the normally non-pressure-sensitive polymers, and is preferably a nonyl phenol or octyl phenol adduct of ethylene oxide containing from about 8 to about 14 ethylene oxide units in the molecule. A blend of surfactants is preferably employed. Surfactants with higher concentrations of ethylene oxide units, e.g., about 30 to about 50 ethylene oxide units in the molecule, aid component compatibility but at some expense to humidity resistance.

There may be optionally included a catalyst for achieving crosslinking between the available acrylic acid units to control cohesive strength, the catalyst being water-soluble salts of at least one di- or tri-valent metal, preferably organic acid salts of a di- or tri-valent metal.

The adhesive compositions of the instant invention are applied to a substrate forming a label stock as a water base.

In the presently preferred composition, the elastomeric polymer is an interpolymer of vinyl acetate-acrylic acid and 2-ethylhexyl acrylate. Although alkali-soluble and formable by emulsion polymerization, such polymers are generally non-water-soluble and have no adhesion, but are elastomeric.

The second component is preferably an emulsion copolymer of methacrylic acid and ethyl acrylate; which again is non-water-soluble and, although pliable, is brittle and not a pressure-sensitive adhesive. The total of the backbone copolymers in the dry-base pressure-sensitive composition is from about 20 to about 55 percent by weight. The acrylic acid polymer system comprises from about 8 to about 35 percent by weight of the total composition on a dry basis, and is present in an amount adequate to absorb moisture at a controlled rate from a surface without loss of tack or degradation of the adhesive.

The acrylic acid polymer system is presently preferred to be a blend (dry basis) of from about 3 to about 15 parts by weight of an acrylic acid homopolymer having a molecular weight of about 60,000, and from about 5 to about 20 parts by weight based on total dry weight of the composition, of an acrylic acid homopolymer having a molecular weight of about 100,000.

The tackifier system is preferably composed of an octyl phenol adduct of ethylene oxide containing from about 12 to about 14 ethylene oxide units per molecule and present in an amount of from about 20 to about 40 percent by weight of the dry composition, a nonyl phenol adduct of ethylene oxide containing from about 9 to about 10 ethylene oxide units per molecule and present in an amount of from about 5 to about 15 parts by weight of the total composition, and an octyl phenol adduct of ethylene oxide containing about 40 ethylene oxide units in the molecule and present in an amount of from about 2 to about 10 percent by weight, dry basis. If employed, the catalyst is normally present in an amount of up to about 0.25 percent by weight. The adhesive composition may include, besides water, defoamers and the like. Also included in the adhesive composition are colorants and other materials which do not influence the adhesive properties.

DETAILED DESCRIPTION

There is provided a three-component adhesive system formed of constituents, none of which is pressure-sensitive in nature but which in combination provides a pressure-sensitive adhesive system which is resistant to modification by changes in humidity; can be applied to wet surfaces by conventional means with permanence of adhesion; and yet is removable by cold and hot water-based cleansing operations. The adhesive comprises a non-water-soluble, normally copolymeric backbone system in combination with a water-soluble acrylic acid polymer system and a tackifier which is a non-ionic alkylaryl polyether surfactant.

The first component of the system is a water-insoluble, or substantially water-insoluble, polymeric system comprised of an elastomeric polymeric component and a brittle polymeric component. The elastomeric component adds softness to the net composition, while the more brittle copolymeric component adds backbone to the adhesive system.

In the preferred compositions, the elastomeric component is alkali-soluble and comprises an interpolymer of vinyl acetate and acrylic acid, alone or with one or more additional comonomer(s). The elastomeric component forms a tough, elastic film and imparts water resistance, even though it is alkali-soluble. The presently preferred elastomeric component is an emulsion terpolymer of vinyl acetate, acrylic acid and 2-ethylhexyl acrylate. While alkali-soluble, the terpolymer is water-insoluble and is not a pressure-sensitive adhesive.

The second component of the polymer is also water-insoluble and not a pressure-sensitive adhesive, and is normally regarded as providing a brittle, though pliable, film which imparts cohesive strength. The preferred copolymers are emulsion copolymers of methacrylic acid and ethyl acrylate, which are not hydrophilic and which also impart water resistance.

The second constituent of the system is the acrylic acid polymer system. By "acrylic acid polymer system" as used herein, there is meant one or more acrylic acid homopolymer(s) and/or acrylic acid copolymer(s) containing a predominant amount of acrylic acid. Where a copolymer is employed, the comonomer, if present in any significant amount, must be hydrophilic, for hydrophobic properties will hinder the functionality of the acrylic acid polymer system in the combination. A minor amount of a hydrophobic comonomer is, however, tolerable. Whether provided by a single polymer or a mixture of polymers, it is presently required that the acrylic acid polymer system have an average molecular weight between about 70,000 and about 90,000 and display the properties of moisture absorption without adhesive degradation. It is preferred that the acrylic acid polymer system be composed of a high molecular-weight acrylic acid homopolymer having a molecular weight of about 100,000 and a low molecular-weight acrylic acid homopolymer having a molecular weight of about 60,000. The high molecular-weight acrylic acid homopolymer is water-soluble and, in the adhesive composition, controls the rate at which water is absorbed from a substrate. This enables water to be absorbed form a substrate without loss of tack. The low molecular-weight acrylic acid homopolymer acts synergistically and balances the high molecular-weight acrylic acid homopolymer by affording fast water pickup to enable attachment of adhesive labels to a moist substrate by conventional label application machinery. If used alone, however, water pickup would occur to the extent of causing a loss of cohesive strength of the polymer and adhesive failure.

The third component of the system is a liquid plasticizer based on one or more nonionic surfactants which are alkylaryl polyether alcohols, preferably nonyl phenol adducts of ethylene oxide and/or octyl phenol adducts of ethylene oxide. They induce tack to the film-forming components of the pressure-sensitive adhesive, which are non-pressure-sensitive in nature while, at the same time, imparting humidity resistance. The preferred adducts contain from about 8 to about 14 ethylene oxide units per molecule. Adducts containing higher ethylene oxide may be employable to aid in forming a homogeneous adhesive composition but are more hydrophilic. In the preferred composition, there is employed a combination of a nonyl phenol adduct of ethylene oxide containing from about 9 to about 10 ethylene oxide units per molecule, an octyl phenol adduct of ethylene oxide containing from about 12 to about 14 ethylene oxide units per molecule, and an octyl phenol adduct of ethylene oxide containing about 40 ethylene oxide units per molecule. The latter is the most hygroscopic of the tackifier system, and is employed to render the low molecular-weight acrylic acid homopolymer of the acrylic acid component mutually soluble in the adhesive system.

In the preferred adhesive compositions of the invention, the adhesive will contain from about 20 to about 45 percent by weight, based on the total weight of the dry adhesive constituents, of the backbone polymers, of which from about 15 to about 40 percent by weight is the elsatomeric interpolymer, and from about 5 to about 15 percent by weight is the brittle copolymer. The acrylic acid polymer system comprises from about 8 to about 35 percent by weight, based on the total weight of the dry adhesive. When the acrylic acid polymer system employs a mixture of high molecular-weight acrylic acid homopolymers and low molecular-weight acrylic acid homopolymers, the high molecular-weight acrylic acid homopolymer comprises from about 5 to about 20 percent by weight of the adhesive, while the low molecular-weight acrylic acid homopolymer comprises from about 3 to about 15 percent by weight of the adhesive.

Tackifier plasticizers comprise from about 25 to about 45 percent by weight of the adhesive on a dry basis. It is presently preferred that an octyl phenol adduct of ethylene oxide having from about 12 to about 14 ethylene oxide units in the molecule be present in an amount of from about 20 to about 40 percent by weight of the adhesive; an octyl phenol adduct of ethylene oxide having about 40 units of ethylene oxide be present in an amount of from about 2 to about 10 percent by weight of the adhesive; and a nonyl phenol adduct of ethylene oxide having from about 9 to about 10 ethylene oxide units be present in an amount of from about 5 to about 15 percent by weight of the dry adhesive.

The adhesive is formulated as an aqueous system for application to a face material. On a corresponding basis, the elastomeric interpolymer will comprise from about 15 to about 30 percent by weight of the wet adhesive formulation; the brittle copolymeric component from about 4 to about 20 percent by weight; the high molecular-weight acrylic acid homopolymer from about 5 to about 25 percent by weight; the low molecular-weight acrylic acid homopolymer from about 5 to about 25 percent by weight; the octyl phenol adduct of ethylene oxide constituent containing from about 12 to about 14 ethylene oxide units per molecule present in an amount of from about 10 to about 30 percent by weight; the nonyl phenol adduct of ethylene oxide containing from about 9 to about 10 ethylene oxide units per molecule and present in an amount of from about 2 to about 10 percent by weight, and the octyl phenol adduct of ethylene oxide containing 40 ethylene oxide units per molecule present in an amount of from about 2 to about 40 percent by weight. To induce crosslinking within the polymer and to improve cohesive strength, there may be employed a catalyst which causes crosslinking between the acrylic acid groups. An amount up to about 0.25 percent by weight of either the wet or dry adhesive composition may be employed. The normal catalysts are soluble salts of di- and tri-valent metals such as zinc and chromium salts, with a chrome complex of stearic acid being presently preferred. Defoamers may be included, normally in an amount of up to about 0.1 percent by weight of the total composition, wet or dry. Water provides the balance of the wet adhesive composition, and is normally added in an amount of from about 20 to about 40 percent by weight of the total wet adhesive composition for application to a paper substrate.

The wet adhesive formulation may be applied to one or both components of an adhesive label stock by any conventional means to yield, upon evaporation of water and lamination, an adhesive stock having excellent pressure-sensitive, quick-stick characteristics, the ability to be applied to wet or dry surfaces, whether polar or non-polar in nature, hot or cold, over a range of temperatures from reduced-humidity conditions to elevated-humidity conditions.

By "wet surface" as used herein there is meant a surface which may range from a water-rinsed surface having residual water contained thereon, to one which is a cold substrate having water of condensation thereon.

Adhesives of the instant invention are adaptive to all such conditions and impart a quick, permanent adhesive tack to a substrate and while in storage, i.e., pre-application to the substrate and after application to the substrate, are relatively unaffected by changes in humidity. They are particularly of low cost and are readily formulatable for a wide range of permanent adhesive compositions for conventional tamperproof application to a substrate but where the adhesive can yet be removed by water and/or alkali, with or without water-detergent systems, either cold or hot, depending on the net composition formulated. What is particularly unique about the adhesive systems of the invention is that the tackifying agent is normally a surfactant. Although expected to aid in removal of adhesive from the substrate, this property plays essentially no part in the adhesive formulation, and enhances humidity resistance. The balance of the constituents of the adhesive are non-pressure-sensitive in nature, and without the presence of the liquid plasticizer/tackifier, would be non-functional as pressure-sensitive adhesives in the composition ranges described herein. When placed together, however, all constituents are compatible, all mutually interact to provide a permanent adhesive and one which can be applied to a paper base typical of pressure-sensitive adhesive labels and a labelstock without bleed-through of the paperstock with, as indicated, excellent resistance to humidity, tamperproofness, and yet ready removability when the label has served its utility as a label.

The presently preferred compositions of the instant invention, in their broadest and narrowest and wet and dry formulations, are as follows:

TABLE 1

| BROAD COMPOSITION RANGE | | |
|---|---|---|
| Ingredient | Weight Percent of Wet Adhesive | Weight Percent of Dry Adhesive |
| Covinax 107 UFP[1] | 15–30 | 15–40 |
| Viscon 103[2] | 4–20 | 5–15 |
| Alcosperse 406[3] | 5–25 | 5–20 |
| Alcosperse 404[3] | 5–25 | 3–15 |
| Triton X-102[4] | 10–30 | 20–40 |
| Triton X-405[4] | 2–10 | 2–10 |
| Triton N-101[4] | 2–10 | 5–15 |
| Quilon C[5] | 0–0.25 | 0–0.11 |
| L-418 Defoamer[6] | 0–0.10 | 0–0.10 |
| Water | 20–40 | — |

TABLE 2

| PREFERRED COMPOSITION RANGE | | |
|---|---|---|
| Ingredient | Weight Percent of Wet Adhesive | Weight Percent of Dry Adhesive |
| Covinax 107 UFP[1] | 17–19 | 20–22 |
| Viscon 103[2] | 16–17 | 13.5–14.5 |
| Alcosperse 406[3] | 12–14 | 8–9 |
| Alcosperse 404[3] | 6–7 | 4–5 |
| Triton X-102[4] | 13–14 | 30–35 |
| Triton X-405[4] | 4–5 | 8–9 |
| Triton N-101[4] | 3.5–4.5 | 8–9 |
| Quilon C[5] | 0–0.15 | 0–0.11 |
| L-418 Defoamer[6] | 0–0.04 | 0–0.10 |

TABLE 2-continued

PREFERRED COMPOSITION RANGE

| Ingredient | Weight Percent of Wet Adhesive | Weight Percent of Dry Adhesive |
|---|---|---|
| Water | Balance | — |

[1] a vinyl acetate-acrylic acid-2-ethylhexyl acrylate polymer manufactured and sold by Franklin Chemical Company
[2] a methacrylic acid-ethyl acrylate copolymer manufactured and sold by Armak Pioneer Chemical Division, Akzona, Inc.
[3] acrylic acid homopolymers manufactured and sold by Alco Chemical Corporation
[4] ethylene oxide adducts manufactured and sold by Rohm & Haas Company
[5] a chrome (III) stearic acid complex manufactured and sold by E. I. duPont de Nemours, Inc.
[6] Drew Chemical Company As stated in part, the adhesive compositions of the present invention have very good adhesion to both wet and dry surfaces, whether they are polar or non-polar, and develop sufficient permanence to be tamperproof when combined with ordinary label papers, but are easily removed when desired with hot or cold water or with detergents and alkalis such as are used in commercial cleaning operations. They resist both high and low relative humidity well enough to hold labels securely on small-diameter objects under humidity extremes, and do not require special packaging as do other water-soluble pressure-sensitive tape and label products. Moreover, compounding is inexpensive from available commercial materials, from an aqueous medium which eliminates the hazards of solvent-borne adhesives. Since the pressure-sensitive adhesives resist the effects of humidity extremes, high relative humidities do not cause liquid components to migrate through label papers, so there is no staining, which is a common characteristic with other water-soluble adhesives.

While the specification has been directed to novel adhesive compositions, both in their wet-formulation and dry-use states, it is to be understood that there may be included as functional ingredients but as diluents, insofar as adhesive properties are concerned. Materials such as colorants, anti-oxidants, UV stabilizers and the like may be included without departing from the properties of the adhesive compositions.

While the invention, as indicated, is primarily concerned with adhesive compositions, there is also contemplated within the scope of the invention, facestocks and their obvious sub-components, tapes and labels, which comprise as the adhesive portion thereof the humidity-resistant wet-stick adhesives of the instant invention. Stock materials are formed by applying from the water-base composition, the adhesive formulation, preferably to the release liner, but alternately to the face material, or both, followed by drying to remove the water, which may normally be achieved within two minutes at 90° C., then laminating the face material to the release liner to form a pressure-sensitive adhesive stock from which tapes and labels may be cut.

What is claimed is:

1. A humidity-resistant wet-stick pressure-sensitive composition comprising, based on the total weight of the dry adhesive:
   (a) from about 20 to about 55 percent by weight of a substantially non-water-soluble backbone polymer system comprised of a normally solid, elastomeric interpolymer of vinyl acetate and acrylic acid, and a normally solid, brittle copolymer provided for cohesive strength;
   (b) from about 8 to about 35 percent by weight of an acrylic acid polymer system having an average molecular weight of between about 70,000 and 90,000 and capable of absorbing moisture from a wet surface without loss of cohesive strength or tack of the adhesive composition; and
   (c) from about 20 to about 65 percent by weight of a tackifier system comprising at least one nonionic surfactant which is an alkylaryl polyether present in an amount sufficient to induce pressure-sensitive adhesive properties to the composition.

2. A composition as claimed in claim 1 which includes a water-soluble catalyst of a di- or tri-valent metal which is capable of crosslinking carboxylic groups to increase the cohesive strength of the acrylic acid component of the adhesive composition.

3. A composition as claimed in claim 1 in which the interpolymer is an interpolymer of vinyl acetate, acrylic acid and 2-ethylhexyl acrylate.

4. A humidity-resistant wet-stick pressure-sensitive adhesive composition which comprises, based on the total weight of the dry adhesive composition:
   (a) a backbone copolymer comprised of:
      (i) an elastomeric, normally solid alkali-soluble terpolymer of vinyl acetate, acrylic acid and 2-ethylhexyl acrylate and present in an amount of from about 15 to about 40 percent by weight of the adhesive composition; and
      (ii) a copolymer of methacrylic acid and ethyl acrylate present in an amount of from about 5 to about 15 percent by weight of the adhesive composition;
   (b) an acrylic acid polymer system having an average molecular weight of between about 70,000 and about 90,000 and comprised of:
      (i) an acrylic acid homopolymer having a molecular weight of about 100,000 and present in an amount of from about 5 to about 20 percent by weight of the adhesive composition; and
      (ii) an acrylic acid homopolymer present in an amount of from about 3 to about 15 percent by weight of the adhesive composition;
   (c) a tackifier system comprising:
      (i) an octyl phenol adduct of an ethylene oxide polymer containing from about 12 to about 14 ethylene oxide units in the molecule and present in a concentration of from about 30 to about 40 percent by weight of the adhesive composition;
      (ii) a nonyl phenol adduct of an ethylene oxide polymer containing from about 9 to about 10 ethylene oxide units per molecule and present in an amount of from about 5 to about 15 percent by weight of the adhesive composition; and
      (iii) an octyl phenol adduct of an ethylene oxide polymer containing about 40 ethylene oxide units per molecule and present in an amount of from about 2 to about 10 percent by weight of the adhesive composition.

5. An adhesive composition as claimed in claim 4 in which there is present a catalyst capable of crosslinking the carboxylic acid groups, said catalyst formed of a water-soluble salt of a di- or tri-valent metal.

6. A humidity-resistant wet-stick pressure-sensitive adhesive composition which comprises, based on the total weight of the dry adhesive composition:
   (a) a backbone polymer system comprising:
      (i) from about 20 to about 22 percent by weight of the adhesive composition of an elastomeric, normally solid interpolymer comprised of vinyl acetate, acrylic acid and 2-ethylhexyl acrylate; and (ii) from about 13.5 to about 14.5 percent by weight of the adhesive composition of a copolymer comprising methacrylic acid and ethyl acrylate;

(b) an acrylic acid polymer system comprising:
   (i) from about 8 to about 9 percent by weight based on the weight of the adhesive composition of an acrylic acid homopolymer having an average molecular weight of about 100,000;
   (ii) from about 4 to about 5 percent by weight based on the weight of the adhesive composition of an acrylic acid homopolymer having an average molecular weight of about 60,000;

(c) a tackifier system comprising:
   (i) from about 30 to about 35 percent by weight based on the weight of the adhesive composition of an octyl phenol adduct of an ethylene oxide polymer containing from about 12 to about 14 ethylene oxide units per molecule;
   (ii) from about 8 to about 9 percent by weight based on the weight of the adhesive composition of a nonyl phenol adduct of an ethylene oxide polymer containing from about 9 to about 10 ethylene oxide units in the molecule; and
   (iii) from about 8 to about 9 percent by weight based on the weight of the adhesive composition of an octyl phenol adduct of an ethylene oxide polymer containing about 40 ethylene oxide units per molecule.

7. A pressure-sensitive adhesive label stock comprising a face material laminated to a release liner by an adhesive which is a humidity-resistant wet-stick pressure-sensitive composition comprising, based on the total weight of the dry adhesive:
   (a) from about 20 to about 55 percent by weight of a substantially non-water-soluble backbone polymer system comprised of a normally solid, elastomeric interpolymer of vinyl acetate and acrylic acid, and a normally solid, brittle copolymer provided for cohesive strength;
   (b) from about 8 to about 35 percent by weight of an acrylic acid polymer system having an average molecular weight of between about 70,000 and 90,000 and capable of absorbing moisture from a wet surface without loss of cohesive strength or tack of the adhesive composition; and
   (c) from about 20 to about 65 percent by weight of a tackifier system comprising at least one nonionic surfactant which is an alkylaryl polyether present in an amount sufficient to induce pressure-sensitive adhesive properties to the composition.

8. A composition as claimed in claim 7 which includes a water-soluble catalyst of a di- or tri-valent metal which is capable of crosslinking carboxylic groups to increase the cohesive strength of the acrylic acid component of the adhesive composition.

9. A composition as claimed in claim 7 in which the interpolymer is an interpolymer of vinyl acetate, acrylic acid and 2-ethylhexyl acrylate.

10. A pressure-sensitive adhesive label stock comprising a face material laminated to a release liner by an adhesive which is a humidity-resistant wet-stick pressure-sensitive adhesive composition comprising, based on the total weight of the dry adhesive:
   (a) a backbone copolymer comprised of:
      (i) an elastomeric, normally solid alkali-soluble terpolymer of vinyl acetate, acrylic acid and 2-ethylhexyl acrylate and present in an amount of from about 15 to about 40 percent by weight of the adhesive composition; and
      (ii) a copolymer of methacrylic acid and ethyl acrylate present in an amount of from about 5 to about 15 percent by weight of the adhesive composition;
   (b) an acrylic acid polymer system having an average molecular weight of between about 70,000 and 90,000 and comprised of:
      (i) an acrylic acid homopolymer having a molecular weight of about 100,000 and present in an amount of from about 5 to about 20 percent by weight of the adhesive composition;
      (ii) an acrylic acid homopolymer present in an amount of from about 3 to about 15 percent by weight of the adhesive composition;
   (c) a tackifier system comprising:
      (i) an octyl phenol adduct of an ethylene oxide polymer containing from about 12 to about 14 ethylene oxide units in the molecule and present in a concentration of from about 30 to about 40 percent by weight of the adhesive composition;
      (ii) a nonyl phenol adduct of an ethylene oxide polymer containing from about 9 to about 10 ethylene oxide units per molecule and present in an amount of from about 5 to about 15 percent by weight of the adhesive composition; and
      (iii) an octyl phenol adduct of an ethylene oxide polymer containing about 40 ethylene oxide units per molecule and present in an amount of from about 2 about 10 percent by weight of the adhesive composition.

11. An adhesive composition as claimed in claim 10 in which there is present a catalyst capable of crosslinking the carboxylic acid groups, said catalyst formed of a water-soluble salt of a di- or tri-valent metal.

12. A pressure-sensitive adhesive label stock comprising a face material laminated to a release liner by an adhesive which is a humidity-resistant wet-stick pressure-sensitive composition comprising, based on the total weight of the dry adhesive:
   (a) a backbone polymer system comprising:
      (i) from about 20 to about 22 percent by weight of the adhesive composition of an elastomeric, normally solid interpolymer comprised of vinyl acetate, acrylic acid and 2-ethylhexyl acrylate; and
      (ii) from about 13.5 to about 14.5 percent by weight of the adhesive composition of a copolymer comprising methacrylic acid and ethyl acrylate;
   (b) an acrylic acid polymer system comprising:
      (i) from about 8 to about 9 percent by weight based on the weight of the adhesive composition of an acrylic acid homopolymer having an average molecular weight of about 100,000;
      (ii) from about 4 to about 5 percent by weight based on the weight of the adhesive composition of an acrylic acid homopolymer having an average molecular weight of about 60,000;
   (c) a tackifier system comprising:
      (i) from about 30 to about 35 percent by weight based on the weight of the adhesive composition of an octyl phenol adduct of an ethylene oxide polymer containing from about 12 to about 14 ethylene oxide units per molecule;
      (ii) from about 8 to about 9 percent by weight based on the weight of the adhesive composition of a nonyl phenol adduct of an ethylene oxide polymer containing from about 9 to about 10 ethylene oxide units in the molecule; and
(iii) from about 8 to about 9 percent by weight based on the weight of the adhesive composition of an octyl phenol adduct of an ethylene oxide polymer containing about 40 ethylene oxide units per molecule.

* * * * *